(12) United States Patent
Lo

(10) Patent No.: US 11,372,278 B2
(45) Date of Patent: Jun. 28, 2022

(54) LIQUID CRYSTAL PANEL CUTTING DEVICE AND METHOD FOR CUTTING LIQUID CRYSTAL PANEL

(71) Applicant: LITEMAX ELECTRONICS INC., New Taipei (TW)

(72) Inventor: Jung-Chi Lo, New Taipei (TW)

(73) Assignee: LITEMAX ELECTRONICS INC., New Taipei (TW)

( * ) Notice: Subject to any disclaimer, the term of this patent is extended or adjusted under 35 U.S.C. 154(b) by 221 days.

(21) Appl. No.: 16/794,263

(22) Filed: Feb. 19, 2020

(65) Prior Publication Data

US 2021/0255501 A1 Aug. 19, 2021

(51) Int. Cl.
*G02F 1/1333* (2006.01)
*G02F 1/13* (2006.01)
*G02F 1/1339* (2006.01)

(52) U.S. Cl.
CPC ...... *G02F 1/133351* (2013.01); *G02F 1/1303* (2013.01); *G02F 1/1339* (2013.01)

(58) Field of Classification Search
None
See application file for complete search history.

(56) References Cited

U.S. PATENT DOCUMENTS

| 2006/0285064 | A1* | 12/2006 | Lee | C03B 33/07 |
| | | | | 349/187 |
| 2007/0164072 | A1 | 7/2007 | Nishio | |
| 2017/0153472 | A1* | 6/2017 | Go | G02F 1/133351 |
| 2020/0257147 | A1* | 8/2020 | Mitsui | G02F 1/1341 |

FOREIGN PATENT DOCUMENTS

EP 1386891 A1 2/2004

* cited by examiner

*Primary Examiner* — Thanh Nhan P Nguyen

(57) ABSTRACT

A liquid crystal panel cutting device for cutting a liquid crystal panel includes a first cutter, a second cutter and a control member, the first cutter having two first cutting wheels that are separated from each other with a distance; the second cutter having a second cutting wheel, and the first cutter and the second cutter are opposite provided and the second cutting wheel is located between the first cutting wheels; and the control member connecting to the first cutter and the second cutter by signals, the control member controlling the first cutter to cut the upper plate downward along a gravity direction, and controlling the second cutter to cut the lower plate upward in a reverse direction of the gravity direction.

8 Claims, 4 Drawing Sheets

LIQUID CRYSTAL PANEL CUTTING DEVICE AND METHOD FOR CUTTING LIQUID CRYSTAL PANEL

BACKGROUND OF THE INVENTION

1. Field of the Invention

The present disclosure relates to a cutting device and a cutting method, and in particular to a liquid crystal panel cutting device and a method for cutting a liquid crystal panel.

2. Description of the Related Art

A liquid crystal panel generally comprises two substrates and liquid crystal sandwiched in the middle. As shown in FIG. 1, when a liquid crystal panel L is desired to perform cutting, a conventional method is to use two cutters T respectively cutting on the upper plate L1 and the lower plate L3 by a little malposition in order to divide the liquid crystal panel L into two components at left and right. Generally speaking, the right component of the cut facing down is an edge section with a smaller area, and the liquid crystal is affected by gravity, the liquid crystal of the liquid crystal interlayer L2 of the right component may leak from the cut, so the right component will usually be discarded and unusable. When the two cutters T in FIG. 1 are provided by malposition, it changes the left component into being discarded and unusable. Because it is not suitable to turn the cut liquid crystal panel over, the conventional cutting method fails to cut a large liquid crystal panel into several small liquid crystal panels. If the conventional cutting method is used to cut the large liquid crystal panel into several small liquid crystal panels, it will cause waste of materials and loss of production costs.

Therefore, in order to solve the various problems of cutting a liquid crystal panel of prior art, the invention provides a liquid crystal panel cutting device and a method for cutting a liquid crystal panel.

BRIEF SUMMARY OF THE INVENTION

An objective of the present disclosure is to provide a cutting device and a cutting method, and in particular to a liquid crystal panel cutting device and a method for cutting a liquid crystal panel.

To achieve at least the above objective, the present disclosure provides a liquid crystal panel cutting device for cutting a liquid crystal panel. The liquid crystal panel comprises an upper plate, a lower plate and a liquid crystal interlayer provided between the upper plate and the lower plate. The liquid crystal panel cutting device comprises a first cutter, having two first cutting wheels that are separated from each other with a distance; a second cutter, having a second cutting wheel, and the first cutter and the second cutter are opposite provided and the second cutting wheel is located between the first cutting wheels; and a control member, connecting to the first cutter and the second cutter by signals, the control member controlling the first cutter to cut the upper plate downward along a gravity direction, and controlling the second cutter to cut the lower plate upward in a reverse direction of the gravity direction.

In an embodiment of the invention, the second cutter is provided to slide along a horizontal direction relative to the first cutter.

In an embodiment of the invention, the second cutting wheel of the second cutter is fixedly provided between the two first cutting wheels of the first cutter in the horizontal direction.

In an embodiment of the invention, the first cutting wheels are separated from each other with 1 mm.

In an embodiment of the invention, the first cutter further includes a wheel pitch adjustment member, and the wheel pitch adjustment member connects to the first cutting wheels and the control member, and the wheel pitch adjustment member adjusts the distance of the first cutting wheels by the control member.

In an embodiment of the invention, further comprising a liquid crystal panel sensing member, and liquid crystal panel sensing member connects the control member by signal, the liquid crystal panel sensing member senses whether there is the liquid crystal panel placed between the first cutter and the second cutter.

The invention further provides a method for cutting a liquid crystal panel, which uses a liquid crystal panel cutting device to cut a liquid crystal panel. The liquid crystal panel comprises an upper plate, a lower plate and a liquid crystal interlayer provided between the upper plate and the lower plate. The liquid crystal panel cutting device comprises a first cutter and a second cutter, the first cutter and the second cutter are opposite provided each other, and the first cutter has two first cutting wheels that are separated from each other with a distance, the second cutter has a second cutting wheel, and the second cutting wheel is located between the first cutting wheels. The method for cutting the liquid crystal panel comprises steps as follows: performing the first cutter to cut the upper plate downward along a gravity direction; performing the second cutter to cut the lower plate upward in a reverse direction of the gravity direction, and a notch of the lower plate is located between the two notches of the upper plate; removing a part between the two notches of the upper plate; dividing the liquid crystal panel into two liquid crystal panel components according to the notch produced by the second cutter; and sealing the cutting edges of the two liquid crystal panel components.

In an embodiment of the invention, further comprising a step: sensing whether there is the liquid crystal panel placed between the first cutter and the second cutter.

Therefore, the invention of a liquid crystal panel cutting device and a method for cutting a liquid crystal panel can make the liquid crystal of the cut liquid crystal panel not leak, and the two liquid crystal panel components that are cut can be put into the subsequent production and manufacture, do not cause waste of materials, and reduce production costs.

DETAILED DESCRIPTION OF THE INVENTION

Figure 1:
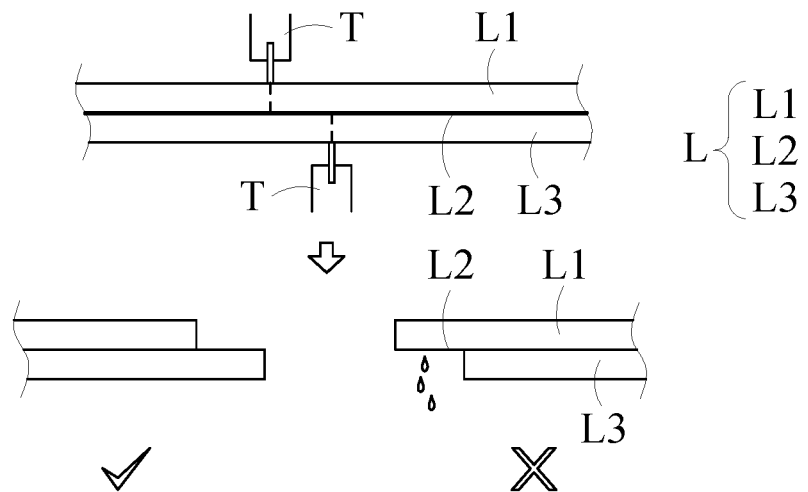
FIG. 1 is a schematic view of a liquid crystal panel cutting of prior art.
Figure 2:
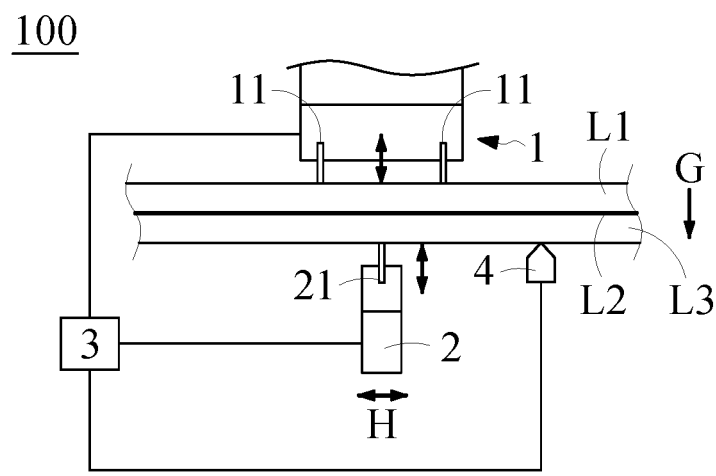
FIG. 2 is a schematic view of a liquid crystal panel cutting device according to the embodiment of the present disclosure.

To facilitate understanding of this present disclosure, embodiments together with the attached drawings for the detailed description of the present disclosure are provided. One skilled in the art can understand the object, characteristics and effects of this present invention by the content described in the specification. It should be noted that various possible modifications and alterations to the details of the specification could be carried out by implementing or applying other different embodiments based on different views and applications without departing from the spirit of the present invention. The related technical contents of the invention will be described in detail by the embodiments. However, the disclosed contents should not be considered to limit the scope of the invention. The description is provided as follows:

As shown in FIG. 2, an embodiment of the invention provides a liquid crystal panel cutting device 100 for cutting a liquid crystal panel L. The liquid crystal panel L comprises an upper plate L1, a lower plate L3 and a liquid crystal interlayer L2 provided between the upper plate L1 and the lower plate L3. In the embodiment, the upper plate L1 and the lower plate L3 are respectively a thin-film transistor (TFT) array substrate and a color filter (CF). However, the invention is not limited to herein, and the upper plate L1 and the lower plate L3 may be any platy members which can sandwich or receive the liquid crystal interlayer L2.

The liquid crystal panel cutting device 100 comprises a first cutter 1, a second cutter 2 and a control member 3.

The first cutter 1 has two first cutting wheels 11 that are separated from each other with a distance.

The second cutter 2 has a second cutting wheel 21, and the first cutter 1 and the second cutter 2 are opposite provided and the second cutting wheel 21 is located between the two first cutting wheels 11, that is to say the blades of the two first cutting wheels 11 and the second cutting wheel 21 are opposite provided.

The control member 3 connects to the first cutter 1 and the second cutter 2 by signals. The control member 3 controls the first cutter 1 to cut the upper plate L1 downward along a gravity direction G, and controls the second cutter 2 to cut the lower plate L3 upward in a reverse direction of the gravity direction G.

Next, referring to FIGS. 3 to 7, a method for cutting a liquid crystal panel by using the liquid crystal panel cutting device 100 of the invention to cut the liquid crystal panel L is illustrated.

Figure 3:
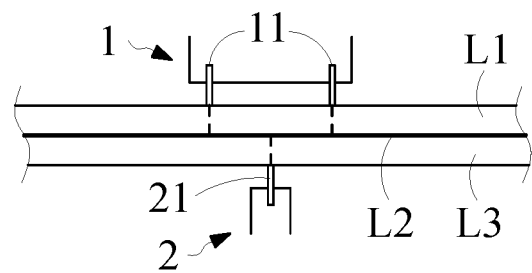
FIG. 3 is a schematic view 1 of a liquid crystal panel cutting step according to the embodiment of the present disclosure.

As shown in FIG. 3, initially as step S102, the control member 3 controls the two first cutting wheels 11 of the first cutter 1 to cut the upper plate L1 downward along a gravity direction G, and leave two parallel notches (shown as dotted lines) on the upper plate L1, the parallel direction is perpendicular to a surface of paper.

As step S103, the control member 3 controls the second cutting wheel 21 of the second cutter 2 to cut the lower plate L3 upward in a reverse direction of the gravity direction G, and a notch of the lower plate L3 is located between the two notches of the upper plate L1.

Figure 4:
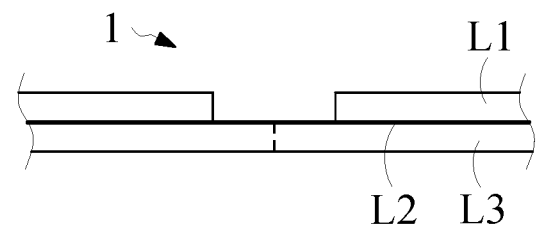
FIG. 4 is a schematic view 2 of a liquid crystal panel cutting step according to the embodiment of the present disclosure.

Next, as step S104 and shown in FIG. 4, a part between the two notches of the upper plate L1 is removed.

Figure 5:
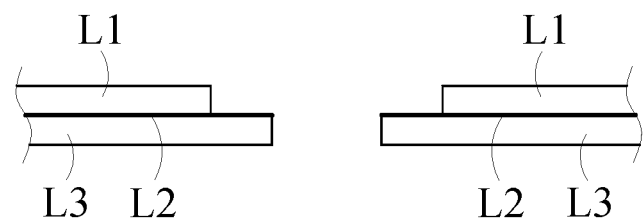
FIG. 5 is a schematic view 3 of a liquid crystal panel cutting step according to the embodiment of the present disclosure.

As step S105 and shown in FIG. 5, the liquid crystal panel is divided into two liquid crystal panel components according to the notch produced by the second cutter 2. Because the liquid crystal interlayer L2 has the lower plate L3 below to support, the liquid crystal does not leak.

Figure 6:
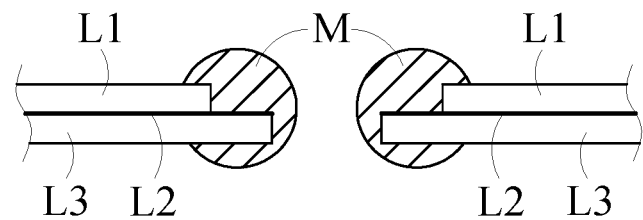
FIG. 6 is a schematic view 4 of a liquid crystal panel cutting step according to the embodiment of the present disclosure.
Figure 7:
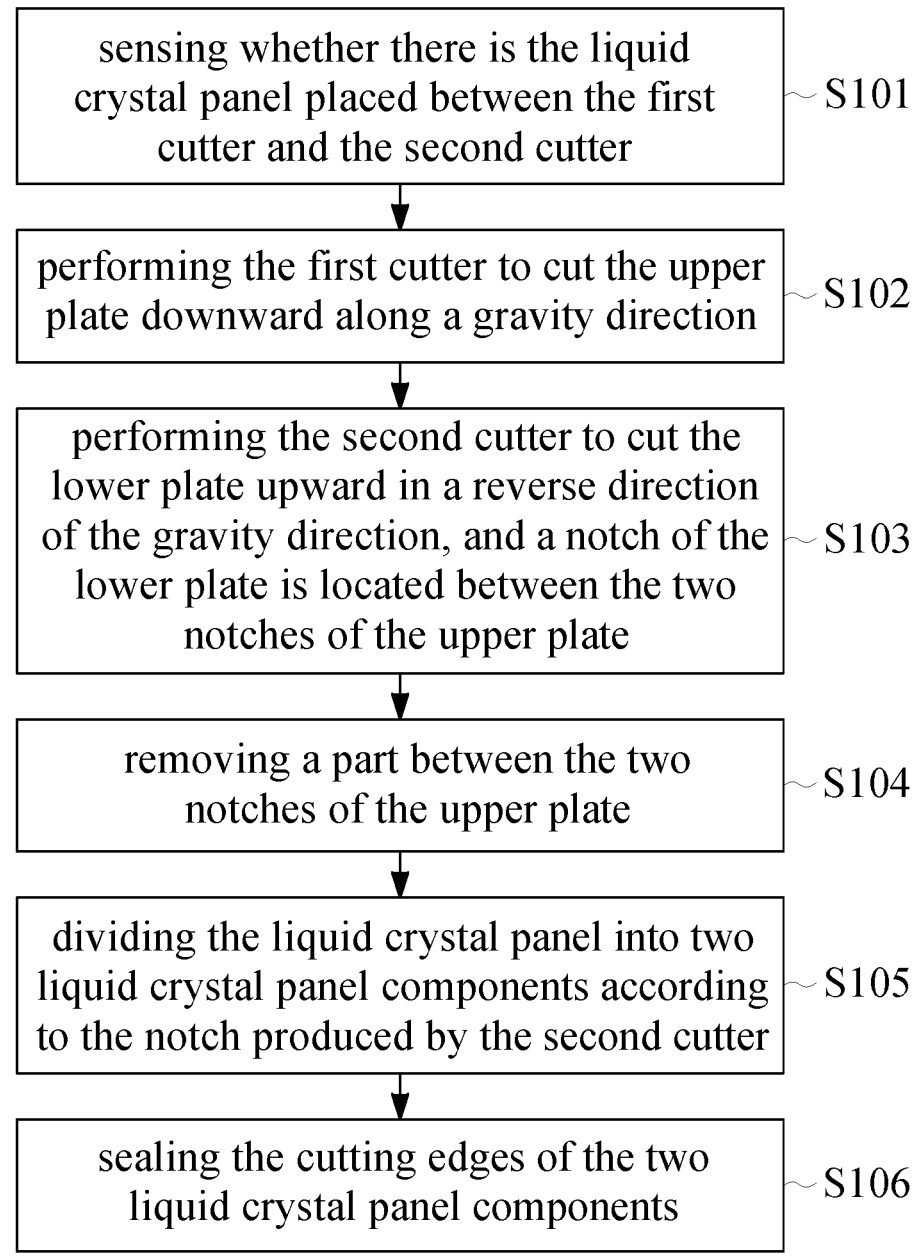
FIG. 7 is a flow chart illustrating a method for cutting a liquid crystal panel according to the embodiment of the present disclosure.

Finally, as step S106 and shown in FIG. 6, the cutting edges of the two liquid crystal panel components are sealed by adhesive M. The adhesive M may be UV hardened adhesive or any conventionally used adhesive, and the present invention is not limited to herein.

Through the invention of a liquid crystal panel cutting device 100 and a method for cutting a liquid crystal panel, the liquid crystal of the cut liquid crystal panel L does not leak, and the two liquid crystal panel components that are cut can be put into the subsequent production and manufacture, do not cause waste of materials, and reduce production costs.

Further, in an embodiment, as shown in FIG. 2, the second cutter 2 has a relatively high degree of freedom, which is provided to slide along a horizontal direction H relative to the first cutter 1. The horizontal direction H is perpendicular to a direction of the gravity direction G. In the liquid crystal panel cutting work, the control member 3 adjusts the position of the second cutting wheel 21 of the second cutter 2 to make the second cutting wheel 21 position itself between the two first cutting wheels 11 in the horizontal direction H. In addition, the second cutting wheel 21 of the second cutter 2 can be driven by a linear motor, hydraulic cylinder or air pressure cylinder to adjust the position in the horizontal direction H. Furthermore, the two first cutting wheels 11 of the first cutter 1 can be driven by a linear motor, hydraulic cylinder or air pressure cylinder to adjust the position in the horizontal direction H.

Figure 8:
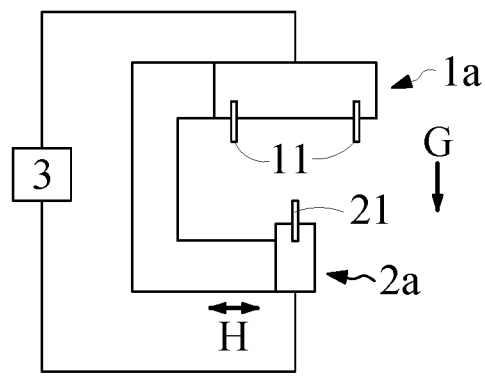
FIG. 8 is a schematic view of a liquid crystal panel cutting device according to another embodiment of the present disclosure.

Further, in an opposite embodiment, as shown in FIG. 8, a second cutting wheel 21 of a second cutter 2 of a liquid crystal panel cutting device 100a is fixedly provided between the two first cutting wheels 11 of the first cutter 1 in the horizontal direction H. In other words, the second cutting wheel 21 only moves along the gravity direction G or a reverse direction of the gravity direction G, which has a position relationship with the two first cutting wheels 11 in the horizontal direction H that is fixed so that it is not necessary to rely on the control member 3 readjusting the position of the second cutting wheel 21 of the second cutter 2 when the cutting work is performed.

Further, in an embodiment, the two first cutting wheels 11 of the first cutter 1 are separated from each other with 1 mm to reduce waste of materials, but the present invention is not limited to herein.

Figure 9:
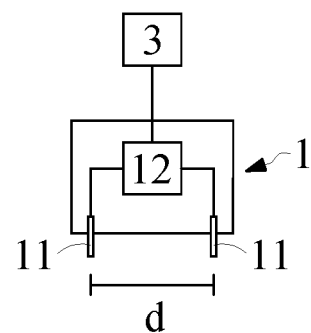
FIG. 9 is a schematic view of a first cutter according to another embodiment of the present disclosure.

Further, in an embodiment, as shown in FIG. 9, the first cutter 1 further includes a wheel pitch adjustment member 12, and the wheel pitch adjustment member 12 connects to the two first cutting wheels 11 of the first cutter 1 and the control member 3. The wheel pitch adjustment member 12 adjusts the distance d of the two first cutting wheels 11 of the first cutter 1 according to the instruction of the control member 3. The wheel pitch adjustment member 12 for example is a combination of stepper motor and gear or screw, which correspondingly adjusts the distance d of the two first cutting wheels 11 in a forward or reverse way of the motor. However, the present invention is not limited to herein. The invention may also adjust the distance d of the two first cutting wheels 11 by means of other mechanical means, such as linear motors, hydraulic cylinders or air pressure cylinders.

Further, in an embodiment, as shown in FIG. 2, the liquid crystal panel cutting device 100 further comprises a liquid crystal panel sensing member 4, and the liquid crystal panel sensing member 4 connects the control member 3 by signal. Shown as step S101 of FIG. 7, the liquid crystal panel sensing member 4 senses whether there is a liquid crystal panel L placed between the first cutter 1 and the second cutter 2. If so, the control member 3 performs the subsequent liquid crystal panel cutting method. In the embodiment, the liquid crystal panel sensing member 4 is a contact sensing member, when touched, the signal is sent to the control member 3. However, the present invention is not limited to herein, the liquid crystal panel sensing member 4 may also be other forms or sensing members using other scientific principles, such as optical sensing members, electrical sensing members, or other kinds of mechanical sensing members.

While the present disclosure has been described by means of specific embodiments, numerous modifications and variations could be made thereto by those skilled in the art without departing from the scope and spirit of the present disclosure set forth in the claims.

What is claimed is:

1. A continuous liquid crystal panel cutting device for cutting a continuous liquid crystal panel, the continuous liquid crystal panel comprising an upper plate, a lower plate and a liquid crystal interlayer continuously provided between the upper plate and the lower plate, the continuous liquid crystal panel cutting device comprising:
    a first cutter, having two first cutting wheels that are separated from each other with a distance;
    a second cutter, having a second cutting wheel, and the first cutter and the second cutter are opposite provided and the second cutting wheel is located between the first cutting wheels; and
    a control member, connecting to the first cutter and the second cutter by signals, the control member controlling two first cutting wheels to cut the upper plate downward along a gravity direction, so that two cutting marks of the upper plate are cracked to the liquid crystal interlayer, and the control member controlling the second cutting wheel to cut the lower plate upward in a reverse direction of the gravity direction, so that a cutting mark of the lower plate is cracked to the liquid crystal interlayer.

2. The liquid crystal panel cutting device according to claim 1, wherein the second cutter is provided to slide along a horizontal direction relative to the first cutter.

3. The continuous liquid crystal panel cutting device according to claim 1, wherein the second cutting wheel of the second cutter is fixedly provided between the two first cutting wheels of the first cutter in the horizontal direction.

4. The continuous liquid crystal panel cutting device according to claim 1, wherein the first cutting wheels are separated from each other with 1 mm.

5. The continuous liquid crystal panel cutting device according to claim 1, wherein the first cutter further includes a wheel pitch adjustment member, and the wheel pitch adjustment member connects to the first cutting wheels and the control member, and the wheel pitch adjustment member adjusts the distance of the first cutting wheels by the control member.

6. The continuous liquid crystal panel cutting device according to claim 1, further comprising a liquid crystal panel sensing member, and the liquid crystal panel sensing member connects the control member by signal, the liquid crystal panel sensing member senses whether there is the continuous liquid crystal panel placed between the first cutter and the second cutter.

7. A method for cutting a continuous liquid crystal panel, which uses a continuous liquid crystal panel cutting device to cut a continuous liquid crystal panel, the continuous liquid crystal panel comprising an upper plate, a lower plate and a liquid crystal interlayer continuously provided between the upper plate and the lower plate, the continuous liquid crystal panel cutting device comprising a first cutter and a second cutter, the first cutter and the second cutter are opposite provided each other, and the first cutter has two first cutting wheels that are separated from each other with a distance, the second cutter has a second cutting wheel, and the second cutting wheel is located between the first cutting wheels, the method for cutting the continuous liquid crystal panel comprising steps as follows:
    performing the two first cutting wheels to cut the upper plate downward along a gravity direction, so that two cutting marks of the upper plate are cracked to the liquid crystal interlayer;
    performing the second cutting wheel to cut the lower plate upward in a reverse direction of the gravity direction, so that a cutting mark of the lower plate is cracked to the liquid crystal interlayer, and the cutting mark of the lower plate is located between the two cutting marks of the upper plate;
    removing a part between the two cutting marks of the upper plate;
    dividing the continuous liquid crystal panel into two liquid crystal panel components according to the cutting mark produced by the second cutter;
    and sealing the cutting edges of the two liquid crystal panel components.

8. The method for cutting a continuous liquid crystal panel according to claim 7, further comprising a step: sensing whether there is the continuous liquid crystal panel placed between the first cutter and the second cutter.

* * * * *